July 19, 1955  R. G. PHILLIPS  2,713,459
FLUID HEATER CONTROL APPARATUS
Filed Sept. 22, 1951  2 Sheets-Sheet 1
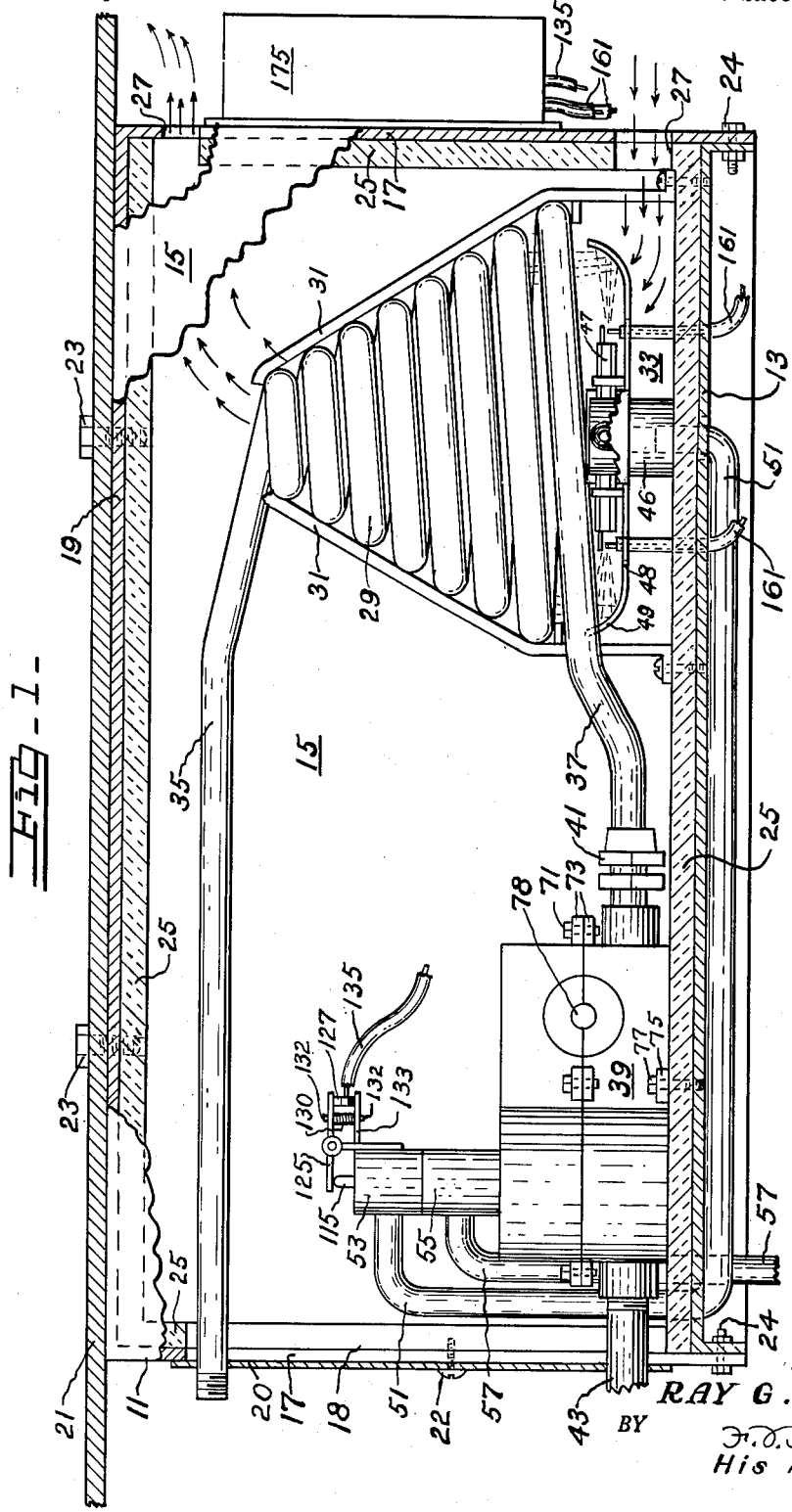
INVENTOR.
RAY G. PHILLIPS
BY
F. D. Hicks
His Attorney July 19, 1955   R. G. PHILLIPS   2,713,459
FLUID HEATER CONTROL APPARATUS
Filed Sept. 22, 1951   2 Sheets-Sheet 2
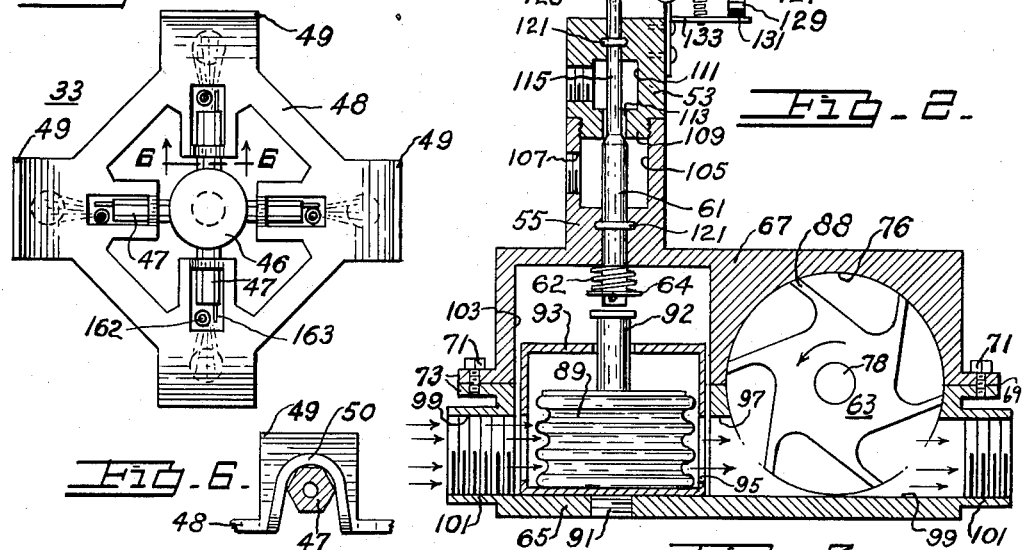
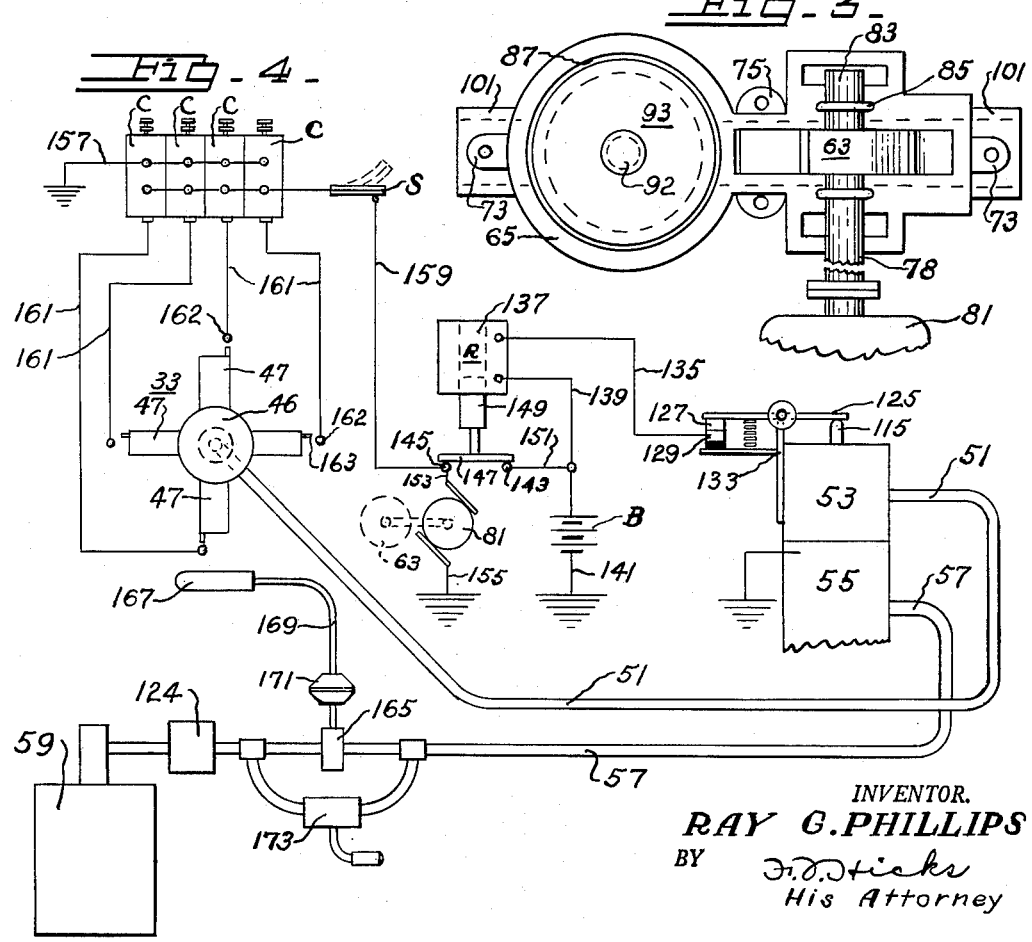
INVENTOR.
RAY G. PHILLIPS
BY J. J. Hicks
His Attorney

United States Patent Office 2,713,459
Patented July 19, 1955

2,713,459
FLUID HEATER CONTROL APPARATUS

Ray G. Phillips, Port Huron, Mich.

Application September 22, 1951, Serial No. 247,877

10 Claims. (Cl. 236—20)

The invention pertains to automatic fluid heater and temperature regulator apparatus and system and more particularly to such apparatus in a conveniently installable unitary form adapted to utilize gas as the heating fuel. This apparatus is an improvement on the invention shown in my Patent 2,619,944 granted December 2, 1952.

The more extensive use of internal combustion engines in very cold climates and the greater use of diesel engines in all locations has created a demand for means to heat or maintain such engines at temperatures suitable to facilitate quick starting at all times. Previously, engine heating apparatus has been utilized which required that the driver of the vehicle perform some act to start the heater into operation when he parked the vehicle. But the human factor entered into the use of such apparatus and frequently vehicles were left unheated leading to extra difficulty and loss of time when the operation of such vehicles was required.

Accordingly it is an object of my invention to provide automatic fluid heater and temperature regulator apparatus which is both convenient to install on vehicles and in other locations and which is also safe and reliable in operation.

Also it is an object of my invention to provide such fluid heater apparatus arranged to burn gas as the heating fuel and conveniently adaptable for connection with commercial bottle gas containers.

It is a further object of my invention to provide a thermostatic gas control valve and a fluid circulator in a compact unit as an element for use in such apparatus.

Another object of my invention is to provide an improved thermostatic gas control valve adapted to operate more accurately in response to temperature variations of the fluid to be heated by such apparatus, and which is conveniently adapted for also controlling an electrical system associated therewith.

A further object of my invention is to provide in combination with such heater apparatus electrical means for providing an igniting spark, for circulating the fluid to be heated, and controlled in accordance with the heat load requirements of the apparatus.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which similar reference characters are applied to corresponding elements throughout, and, wherein:

Fig. 1 is a side elevational view showing my improved automatic fluid heater and regulator as installed under the floor of a vehicle, and partially broken away and sectioned for showing the internal arrangement thereof;

Fig. 2 is a vertical sectional view taken longitudinally through the axis of the improved thermostatic gas control valve and circulator unit;

Fig. 3 is a plan view of said unit with the upper part of the casing removed;

Fig. 4 is a diagrammatic view representing the gas burner and showing the system of controls cooperative therewith;

Fig. 5 is a plan view showing the gas burner; and

Fig. 6 is an enlarged fragmentary sectional view thereof taken on line 6—6 on Fig. 5.

Referring more specifically to Fig. 1 of the drawings, I have illustratively disclosed an embodiment of my improved automatic fluid heater which comprises an enclosing housing 11 with the adjacent sidewall partially broken away and having a base or floor 13 whereon various elements of the system may be mounted. The housing 11 may be made of any suitable sheet metal heavy enough to provide the necessary strength and rigidity for supporting the apparatus and preferably having resistance to corrosion. The housing has enclosing side walls 15, end walls 17, and a top wall 19 whereby it may be mounted under the floor plate 21 of a truck, or other automotive vehicle, as by bolts 23 passing down therethrough. The inside wall surfaces of this fireproof housing 11 are lined with a layer or sheets of heat resistant and insulating material 25 to conserve heat and to avoid exposing adjacent parts of the vehicle to excessively high temperatures. Small vent apertures 27 are provided in one of the end walls. The bolts 23 in securing the housing 11 to the floor plate 21 of the vehicle serve at the same time to "ground" the housing to the vehicle chassis, and one side of each electrical device is grounded to simplify the electrical wiring, in a manner common with automotive vehicles where one terminal of the storage battery is also usually grounded for this reason.

Mounted within the housing I provide a fluid heater coil 29 which is supported upon brackets 31 mounted on and rising from the base floor of the housing so as to be supported above a gas burner 33 mounted on the floor. The fluid heater coil 29 is preferably deformed into a series of coils of successively smaller diameters disposed in vertically spaced relations with the largest coil at the bottom and the smallest coil at the top. The coil so shaped presents a form having substantially the appearance of a frustum of a cone, as shown, and it serves to confine the hot gases to rise centrally above the gas burner and to pass in a more intimate heat exchange relation around the turns of the heater coil. This provides greater thermal efficiency which extends the useful life of each container of "bottle gas."

As shown, the upper end 35 of the heater coil 29 is preferably extended through one end wall 17 of the housing. The other or lower end 37 of the heater coil is connected into one end of a circulator and valve casing 39, by means of pipe fittings 41, and from the other end of this casing a fluid conduit 43 extends out through the end wall 17 of the housing. These extended ends of fluid conduit are adapted to be conveniently connected into the radiator of the vehicle or into circuit relation with the regular cooling medium connections of the engine of the vehicle (not shown), as by having hose nipples thereon, or in any suitable manner.

The gas burner comprises a central gas stem 46, which is supported upon and rises above the floor of the housing for supporting four radial gas nozzles 47, and supplying gas thereinto. A gas flame spreader 48 has vanes 49 curved up under each flame projecting nozzle to project the flame upwardly and it is supported by loops 50 looped upwardly over the gas nozzles, as may be seen in Figs. 1, 5 and 6. A gas supply pipe 51 extends down centrally therefrom and along under the floor and up for connection into a cap 53 on the upper end of a neck 55 on the remote end of the casing 39, as shown in Fig. 1. From this neck 55 a gas conduit 57 extends down through the housing floor 13 and extends to any suitable location where the commercial container 59 (represented in Fig. 4) of "bottle gas" is stored on the vehicle. Such gas lines 51 and 57 are small flexible copper conduits which are easily installed. In a truck the cab compartment may be a convenient location for the gas container 59 and in a passenger vehicle it may be conveniently stored and carried in the regular rear baggage compartment.

Figs. 2 and 3 show the structure of the improved temperature responsive gas regulator valve 61 and the fluid circulator wheel 63, as well as the construction of these into a compact rugged unit. As shown, a unitary casing is provided comprising a lower part 65 and an upper part 67 fitting together snugly along a joint line 69 and secured together by screws 71 passing through pairs of lugs 73 extending cooperatively from the edges of these two casing parts. Floor mounting lugs 75 also extend at spaced points around the bottom edge of the lower casing part for mounting, as by screws 77 passing therethrough into the floor 13 of the housing 11. A fluid circulator wheel 63 is rotatively disposed in fluid driving relation in an enclosing cavity 76, formed half in each part of the casing and having a drive shaft 78 resting in a bearing formed half in each casing part. The drive shaft 78 passes through this bearing and projects externally from the housing for connection with an electric motor 81. The circulator wheel 63 is free in the passage to permit some fluid flow even when the wheel is stationary. This motor is controlled to drive the circulator wheel 63 when the burner is turned on, in a manner to be subsequently described. From the opposite side of the circulator wheel a stub shaft 83 may extend to rotate in a bearing cavity, similarly provided between the casing parts, in order to more accurately maintain the proper alignment of the wheel. Annular packing glands may be provided for receiving packing rings 85 snugly about the shafts to restrict leakage of the engine cooling medium. As shown in Fig. 2, the circulator wheel 63 is formed as a disc having its periphery formed to provide outwardly extending vanes 88 conformed suitably to move the engine cooling medium from left to right when the wheel rotates counterclockwise, as indicated by the arrows. This will cause the engine cooling fluid to enter the bottom of the heater coil, as shown in Fig. 1, and the heater fluid will return to the engine system from the upper end of the coil.

As Figs. 2 and 3 show, the lower casing part 65 is provided with an aperture 87 wherein an expansible temperature responsive bellows 89 is disposed. Such expansible bellows shaped elements are available on the market for temperature controls and these are commonly made very sensitive to expand with considerable force at particular temperatures by being partially filled with an expansible fluid suitably selected, or a liquid having the property of vaporizing at the desired temperature. Screw 91 is a drain plug. From the upper end of the expansible bellows 89 an operator 92 extends upwardly through a guide bracket 93 which has a guide aperture made larger than the operator for passing the latter freely therethrough. The guide bracket 93 is in the form of an enclosing vessel or frame around the bellows and it is provided with side openings 95 through the opposite sides to pass the engine cooling medium freely therethrough and around the expansible bellows. The casing has fluid passing openings 97 and 99, the latter opening (at the ends) through pipe connection nipples 101. The upper portion 67 of the casing is provided with an aperture 103 in alignment with the bellows enclosing aperture 87 and the upper side is recessed for slidably carrying a vertically disposed valve stem 61 with the lower end thereof in alignment with the operator 92, to be actuated by the thermal element. On the upper side of the upper part of the casing 67 the neck 55 encloses a gas intake port 105 having an opening 107 through one side and internally threaded for receiving the threaded end of the conduit 57 which extends to the gas supply container 59. The upper end of the gas intake port 105 opens from the upper end of said neck 55 and it is internally threaded for receiving an externally threaded valve seat ring 109 from the valve cap 53 which is thereby secured upon the upper end of the neck.

The cap 53 and the neck 55 whereupon it is secured may be of circular cross-sections of similar diameters. Said cap 53 has a gas discharge port 111 which receives metered gas through a smaller aperture 113 opening axially down through the valve seat ring 109 into the gas intake port 105. Said aperture 113 is made of a diameter slightly smaller than the valve stem 61 and the latter is turned down tapering to an actuator stem 115 of smaller diameter which passes freely up through this aperture with the tapering portion of the valve stem adapted to approach or seat against the inner edges of the lower end of said aperture in the valve seat ring 109. The latter thus serves as a valve seat whereby to restrict or regulate the passage of the fuel gas from the gas intake port 105 to the gas discharge port 111 in accordance with the amount the valve stem has been lifted up by expansion of the temperature responsive bellows 89. An opening 117 is made from one side of the gas discharge port 111 and this opening is internally threaded to receive the threaded end of the gas supply conduit 51 which extends to the gas burner.

The actuator stem 115 extends upwardly from the valve stem 61 and, being of smaller diameter, it does not interfere with the flow of gas upwardly through the valve seat aperture 113. The upper portion of this actuator stem 115 passes out through an aperture in the upper end of the cap 53 to accomplish external controls, in a manner to be subsequently described.

A packing gland is provided around the valve stem in the bottom of the gas intake port 105 and a suitable O type packing ring 121 may be inserted therein to seal around the valve stem and restrict any fluid leakage along the valve stem. A similar packing ring 121 may be provided around the upper end of the actuator stem 115. The fuel gas is delivered from the usual high pressure "bottle gas" container 59 through a conventional automatic pressure regulator 124 in the usual manner so that a predetermined low gas pressure is maintained in the gas line 57 to the temperature control valve. The cooling medium of the engine being also at a low pressure, only light packing is required around the valve stem and the actuator stem of the temperature control valve.

The upper end of the actuator stem 115 engages a pivoted lever 125 to accomplish an external control by means of an electrical contact 127 which is carried and grounded on the other end of this lever. As the inner end of this lever 125 is lifted by the rising actuator stem 115 in response to rising temperature the outer end of the lever moves downwardly and presses its grounded electrical contact 127 upon a live electrical contact 129 which is mounted on insulation material 131 upon a bracket 133 out from the valve cap and this operation causes the "grounding" of the live contact and any circuit connected thereto.

As diagrammatically represented in Fig. 4, a conductor 135 is connected from the insulated contact 129 on the gas control and fluid circulator unit and this conductor extends to one terminal of the solenoid 137 of a relay R or electromagnetic switch R, and from the other terminal of the solenoid of this switch a conductor 139 connects to one terminal of a battery B, which may be the usual six-volt storage battery having its other terminal grounded in a usual manner, as by a grounding cable 141. The relay has a pair of back contacts 143 and 145 adapted to be bridged by a bridging contact 147 when the relay solenoid is deenergized permitting the armature 149 and the bridging contact to fall back upon the back contacts. As shown, one contact 143 of the pair of back contacts is connected by a conductor 151 to the battery conductor 139. From the other back contact 145 of the relay a conductor 153 extends to one terminal of the fluid circulator motor the other terminal of which is grounded, as by a conductor 155, so the motor 81 will be started and the fluid will be circulated as soon as the relay drops back.

At the same time the circulator is started a spark is provided to ignite the gas burner 33, by means of a vibrator spark coil C having one primary terminal grounded, as by a conductor 157, and the other primary terminal being connected by a conductor 159 to the relay back contact 145 for energizing the spark coil from the battery. From the high tension terminal of the spark coil a well insulated cable 161 extends to a point 162 adjacent the burner 33 which, being a grounded metallic member, receives a spark from the cable and this ignites the gas. The burner may preferably be provided with a projecting spark point 163 to facilitate positioning the spark at the most effective position for igniting the gas. For some types of gas burners one point is sufficient but where the gas burner is of a type having four radially projecting gas nozzles 47, as shown, four such spark coils C may be provided and similarly arranged so that an igniting spark is formed at the outer end of each one of these four burner branches, as shown.

A thermal or stack switch S may be mounted exposed to the rising temperature from the burner and connected in the ignition circuit 159 so that the circuit is opened and the spark is stopped soon after the burner has been ignited. Such thermal switches are available as "stack switches" and are commonly used in furnace control systems. Vibrator spark coils C are well known and have been utilized on a well known automobile some of which are still in operation. The high tension cables 161 are the usual ignition cables used on automobiles.

When the gas is turned on and the burner is ignited, the circulator wheel 63 is started and it continues to rotate and circulate the engine cooling medium until its temperature has been raised to a predetermined temperature when the expansion of the bellows lifts the valve stem 61 and cuts off the gas. At this same time the upper end of the actuator stem 115 is lifted and moves lever 125 to a position where it engages the grounded contact 127 against the live contact 129 thereby energizing the relay R which lifts its bridging contact 147 and opens the circuit of the circulator motor 81 and also the ignition circuit. As soon as the burner cools the stack switch S closes the ignition conductor 159. As the temperature of the engine cooling medium drops a predetermined amount the control bellows contracts and lowers the valve stem 61 to turn on the gas and at the same time the upper end of the actuator stem 115 is lowered causing the grounded contact 127 on the lever 125 to move away from the live contact 129.

This operation deenergizes the relay R which drops its bridging contact 147 to again energize the ignition and operate the fluid circulator motor. These operations are started and stopped at frequent intervals so that the cooling medium of the internal combustion engine is maintained at a good temperature for quick starting and operation of the engine.

As a precaution against starting up the heating system, after it has gone cold, because of a container of "bottle gas" being exhausted, I may provide a cold cut-off valve 165 in the gas line 57 from the gas container. Such control valves are available in the heat control arts, and are actuated to closed position automatically by means of a thermal bulb 167, mounted here so as to be influenced by the temperature in the heater housing 11. When the temperature of the space in this housing goes below a predetermined temperature, the fluid in the bulb 167 contracts and through the conduit 169 actuates an expansible and contractible operator 171 to close this cut-off valve in the gas line. When the attendant removes the exhausted gas container 59 and installs a new one, he has to open a manual shunting valve 173 to pass gas to the burner to get it started. As soon as the apparatus warms up slightly, the cold cut-off valve 165 automatically opens and the shunt valve 173 is then manually closed. This restores the automatic cold cut-off valve 165 ready to perform its safety function of preventing a flow of gas from the next new gas container before or until the attendant has checked the ignition to assure that a spark is present to ignite the gas immediately, and to prevent accidents due to a broken line. In the installation of the heater apparatus on a vehicle the gas supply line 57 is extended from the heater housing 11 to the "bottle gas" container 59 which is carried at some conveniently accessible location on the vehicle. At the same time the cold cut-off valve and the manual shunting valve are also installed at this convenient location. The control conduit 169 for the cold cut-off valve is easily positioned along in side-by-side relation to the main gas line 57 as the latter is installed and also extending to the heater housing 11 wherein it connects into the thermal bulb 167.

The vibrator spark coils C are preferably installed as close to the burner as possible to shorten the high tension cables. This is readily accomplished by providing an electrical instrument casing 175 on one end of the main heater housing so that such electrical apparatus will not be exposed to the corrosive products of combustion. The relay R may also be mounted in the instrument casing. In this manner a compact unitary structure is provided and most of the electrical wiring can be done at the factory, with few connections left to the local installer.

Although the automatic heater apparatus has previously been described for installation upon an automotive vehicle to maintain the engine at a temperature suitable to facilitate quick starting and running when the services of the vehicle are required, it is possible to utilize my heater wherever it is desired to maintain the temperature of a liquid or fluid at a predetermined temperature or within a predetermined range of temperatures. My automatic heater apparatus is ideal for such applications as it is a compact unitary apparatus adapted to operate on "bottle gas," and it is only necessary to connect the ends of the heater coil conduits to receive and circulate the engine cooling water and any automobile storage battery can be conveniently utilized in combination with the apparatus. The heater may be connected with the regular gas mains if these are available, or when standing in a garage, and under such conditions the engine cooling water will circulate sufficiently even if the circulating or agitating wheel 63 is permitted to stand still, as by disconnecting the electric motor.

It will be seen that I have provided an automatic fluid heater for maintaining the temperature of water or other fluids within a desired range and which is a compact independent unitary structure especially convenient for installation upon automotive vehicles to keep the engines thereof heated for quick starting and operation.

As will be understood, the proportions of the ends of the lever 125 on opposite sides of the pivotal support may be made different from that as shown, in order to provide for multiplication of the movement of the movable contact 127. To assure positive opening of the contact 127 from the stationary contact 129 when the thermostatic bellows 93 contracts, a small compression spring 130 is preferably inserted to react between the lever and the bracket 133, where retainer pins 132 may hold it in position, as may be seen in Figs. 1 and 2.

To positively open the gas valve as the thermostatic bellows contracts, a small compression spring 62 is provided on the lower end of the valve stem 61 where it presses down upon a ring 64, as shown in Fig. 2.

To facilitate assembly of the apparatus in the housing 11, one end wall 17 and the insulation 25 (at the left hand end as viewed in Fig. 1) is provided with a slot 18 which extends vertically so that the outwardly projected ends of the conduits 35 and 43 may pass upwardly therein as the base 13 is inserted into the bottom of the housing. A shield 20 is provided upon these conduits and this shield is then secured by a screw 22 passed therethrough into the end wall of the housing for closing the slot in the end of the housing. The bottom wall 13 is then secured in the lower edges of the housing, as by bolts 24.

It will be apparent that within the scope of my invention modifications and different arrangements may be made other than herein disclosed, and the present disclosure is illustrative merely, the invention comprehending variations thereof.

What I claim as my invention is:

1. In an automatic liquid heater and temperature regulator for warming the engines of automotive vehicles the combination of, a heater housing of a fire-proof thermal insulated construction and conveniently mountable upon an automotive vehicle, a gas burner mounted inside of said housing, an engine cooling liquid heater coil mounted adjacent to said burner to be heated thereby, a liquid circulator for moving an engine cooling liquid to be heated through said heater coil, a fuel gas control valve, a thermostat disposed to be thermally associated with the circulating cooling liquid and connected with said gas control valve for admitting fuel gas to said burner in accordance with the temperature of the cooling liquid to be heated thereby, a unitary casing structure enclosing and mounting said control valve with said circulator and thermostat as a unit in said housing, said unitary casing structure also forming conduit means for leading the liquid around said thermostat and cooperatively through said circulator, a liquid conduit connecting from said casing to one end of said heater coil, a liquid conduit connecting from said casing and passing externally of said housing, a liquid conduit connecting from the other end of said heater coil and passing externally of said housing, said liquid conduits passing externally from said housing being exposed for convenient connection into the cooling medium circuit of an internal combustion engine of any automative vehicle whereon the heater may be installed, a gas conduit extending from said gas control valve to said gas burner, a gas conduit extending from said gas control valve and passing from said housing for external connection to a container of fuel gas carried on a vehicle whereon the heater is installed, motive means responsive to operation of said gas control valve for operating said circulator to cause a cooling liquid to move around said thermostat and through said coil to be heated, and ignition means adjacent said gas burner for igniting the burner when gas is supplied thereto by said gas control valve.

2. In an automatic liquid heater and temperature regulator for heating the cooling liquid of engines in automotive vehicles the combination of, a fire-proof thermal insulated housing of a compact size and shape suitable for mounting on an automotive vehicle, a gas burner mounted inside of said housing, a liquid heater coil mounted over said burner to be heated thereby for heating the engine cooling liquid, a liquid circulator for moving liquid to be heated through said heater coil, a fuel gas control valve, a thermostat connected with said gas control valve and disposed for admitting fuel gas to said burner in accordance with the temperature of the engine cooling liquid to be heated thereby, a liquid conduit connecting from said circulator to one end of said heater coil, liquid conduit means connecting from the circulator around said thermostat and passing externally of said housing, liquid conduit means connecting from the other end of said heater coil and passing externally of said housing, said liquid conduit means passing externally from said housing being disposed for convenient connection into the cooling medium circuit of an internal combustion engine of an automotive vehicle whereon the heater may be installed, a gas conduit extending from said gas control valve to said gas burner, a gas conduit extending from said gas control valve and passing from said housing for external connection to a container of fuel gas carried on any vehicle whereon the heater may be installed, an electric motor operable from a vehicle battery for operating said liquid circulator to cause liquid to flow around said thermostat and through said coil to be heated, electric ignition point means adjacent said gas burner for igniting the burner when gas is supplied thereto by said gas control valve, high tension ignition means operative from the vehicle battery for energizing said ignition point means, and electrical control means actuated by movements of said gas control valve for operating said electric motor and said high tension ignition means from a vehicle storage battery when the gas valve opens to pass gas to said burner.

3. An automatic liquid heater and temperature regulator for the engines of automotive vehicles in accordance with claim 2 and further characterized by having a unitary casing for enclosing and mounting said gas control valve, thermostat and fluid circulator and forming cooperative conduit passages in a compact unitary assembly which is easily mounted with a minimum of connections in said housing.

4. A liquid heater and temperature regulator for automotive vehicle engines comprising, a gas burner, an engine cooling liquid heater coil to be heated thereby, a temperature responsive gas control valve for admitting fuel gas to said burner in accordance with the temperature of the engine cooling liquid to be heated by said heater coil, a liquid circulator for circulating engine cooling liquid to be heated through said heater coil, a casing mounting said valve and circulator in a unit and providing fluid flow conduit means interconnecting therebetween, a housing enclosing said casing, burner and heater in a compact assembly for convenient installation, conduit means joining said heater coil and circulator in a cooperative fluid flow relation and extending externally to said housing for convenient connection into an engine cooling system, conduit means connecting said valve to supply regulated gas to said burner, a conduit extending from said valve external to the housing for connection with a fuel gas source, an electric motor connected to drive said circulator, an electric ignition to ignite said burner, said electric motor and ignition being operative from an automotive vehicle battery, and electric control means actuated by said temperature responsive valve for starting said motor and energizing said ignition from the automotive vehicle storage battery when gas is supplied to the burner.

5. A liquid circulating and temperature responsive device comprising, a casing having a lower part and an upper part mountable in cooperative relation thereon, said lower part providing a liquid flow passage extending therethrough, a liquid circulator wheel having a shaft extending axially therefrom and of sufficient length to project from said casing, a portion of said passage in the lower casing part being conformed to provide a cavity to receive the lower portion of said circulator wheel in liquid moving relation therein with a bearing cavity for the lower portion of the shaft, the upper part of said casing providing cooperative cavities for receiving upper portions of said circulator wheel and its shaft, said lower casing part being adapted to house a temperature responsive element in said liquid flow passage, and fuel gas control means in said casing in cooperative connection with said element to be opened or closed in accordance with the temperature of liquid flowing in said passage.

6. A liquid circulating and temperature responsive device in accordance with claim 5 and further characterized by said lower casing part having a temperature responsive element enclosing cavity in connection with said liquid flow passage and opening from the upper side of said lower part, said temperature responsive element being disposed in said cavity for intimate thermal contact with liquid flowing in said passage, the adjacent portion of the upper casing part having a cooperative cavity above said element receiving cavity in the lower part, gas control valve means on said upper casing part, and valve actuator means extending down in said cooperative cavity of the upper part for cooperative engagement with the temperature responsive element in the lower casing part.

7. A liquid circulating and temperature responsive device in accordance with claim 6 and further characterized by said upper casing part having an upstanding neck enclosing said gas valve and the valve actuator means, and said valve actuator means extending up from the upper end of said neck for effecting an external control simultaneously with the opening and closing of said valve means.

8. A liquid circulator and temperature control device comprising, a casing having a liquid flow passage extending therethrough, a liquid circulator in said casing and associated with said passage for moving liquid therethrough, a temperature responsive element in said casing and disposed for intimate thermal exposure to liquid flowing in said passage, a neck projecting from said casing and having an aperture interconnecting a gas intake port and a gas discharge port in aligned relation therein, a valve stem of a diameter larger than the diameter of said aperture and having one end tapered to approach the intake end of said axial aperture in a gas flow restricting relation, the other end of said valve stem being disposed for operative engagement by said temperature responsive element to move the valve stem and regulate the flow of gas through said aperture in accordance with the temperature of liquid in said passage.

9. A liquid circulator and temperature control device in accordance with claim 8 and further characterized by having an actuator pin extending from the tapered end of said valve stem and of a smaller diameter than said aperture for passing freely therethrough while gas may also pass freely through said aperture, the extended end of said actuator pin passing through a sidewall of said discharge port to accomplish an external control in accordance with the movements of the valve stem in regulating the flow of gas.

10. A liquid circulator and temperature control device in accordance with claim 9 and having electrical contact means disposed for opening by the externally extended end of said actuator pin, when the valve moves to open position.

References Cited in the file of this patent

UNITED STATES PATENTS

| Number | Name | Date |
|---|---|---|
| 886,100 | Walker | Apr. 28, 1908 |
| 1,032,727 | Appler | July 16, 1912 |
| 1,178,433 | Wight | Apr. 4, 1916 |
| 1,843,566 | Lake | Feb. 2, 1932 |
| 2,012,728 | Olson | Aug. 27, 1935 |
| 2,143,569 | Nessell | Jan. 10, 1939 |
| 2,263,999 | McCollum | Nov. 25, 1941 |
| 2,333,602 | Van Almelo | Nov. 2, 1943 |
| 2,521,866 | Ott | Sept. 12, 1950 |